N. W. STORER.
LOCOMOTIVE.
APPLICATION FILED OCT. 30, 1916.
1,302,099.
Patented Apr. 29, 1919.
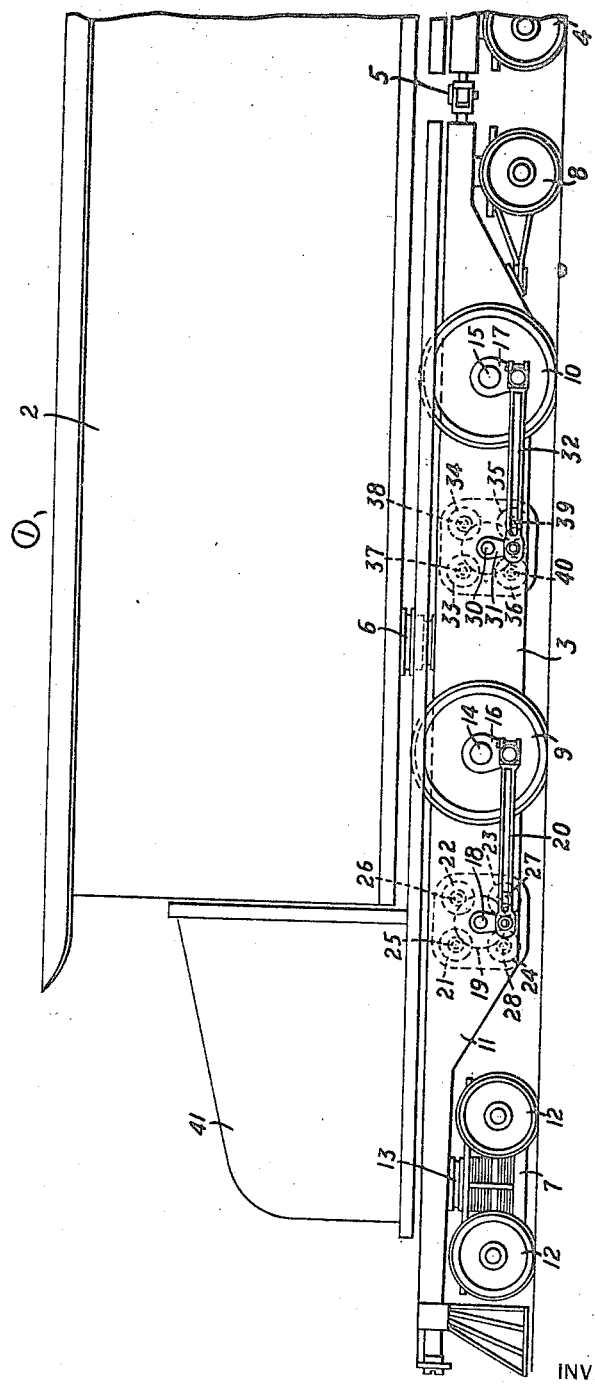
WITNESSES:
Fred. A. Lind.
W. B. Wells
INVENTOR
Norman W. Storer
BY
Wesley G. Carr
ATTORNEY

UNITED STATES PATENT OFFICE.

NORMAN W. STORER, OF PITTSBURGH, PENNSYLVANIA, ASSIGNOR TO WESTINGHOUSE ELECTRIC AND MANUFACTURING COMPANY, A CORPORATION OF PENNSYLVANIA.

LOCOMOTIVE.

1,302,099.    Specification of Letters Patent.    Patented Apr. 29, 1919.

Application filed October 30, 1916. Serial No. 128,411.

*To all whom it may concern:*

Be it known that I, NORMAN W. STORER, a citizen of the United States, and a resident of Pittsburgh, in the county of Allegheny and State of Pennsylvania, have invented a new and useful Improvement in Locomotives, of which the following is a specification.

My invention relates to locomotives and particularly to electric locomotives.

One object of my invention is to provide a locomotive which shall be capable of producing a high tractive effort when operating at a high speed.

Another object of my invention is to provide a locomotive of the above-indicated character having a single cab combined with a plurality of articulated running gears, so that all the control apparatus may be concentrated in one cab.

More specifically, my invention embodies a locomotive provided with a cab and two articulated running gear units which are pivotally connected to the cab. Each of the running gears has a four-wheel pivotal outer truck, a two-wheel radial inner truck, a plurality of pairs of driving wheels disposed between the inner and the outer trucks, a jack shaft mounted adjacent, and connected to, each pair of driving wheels and a plurality of motors connected to each jack shaft.

The single figure of the accompanying drawing is a side elevational view of a portion of a locomotive constructed in accordance with my invention.

Referring to the drawing, a locomotive 1 is illustrated that embodies a cab 2 and two articulated running gears 3 and 4 which are connected together by means of an articulated connection 5 and are pivotally connected to the cab 2 by means of pivotal connections 6, one only of which is illustrated. The two running gears 3 and 4 are of like construction and, accordingly, only the running gear 3 is described in detail. The running gear 3 embodies an outer truck 7, a two-wheel radial truck 8 and two pairs of driving wheels 9 and 10 which are mounted in side frames 11 of the running gear.

The outer truck 7 embodies two pairs of wheels 12 which are connected, by a pivotal connection 13, to the side frames 11 of the running gear 3. The two pairs of driving wheels 9 and 10 are respectively mounted on axles 14 and 15 and are provided with driving cranks 16 and 17.

A jack shaft 18, having gear wheels 19 mounted thereon, is disposed adjacent to the driving wheels 9 and is connected to the driving crank 16 by means of a side rod 20. Four motors 21, 22, 23 and 24, having pinions 25, 26, 27 and 28, are symmetrically mounted around the jack shaft 18 so that the pinions shall mesh with the gear wheel 19 which is mounted upon the jack shaft.

A jack shaft 30, having gear wheels 31 mounted thereon, is disposed adjacent to the pair of driving wheels 10 and is connected to the driving crank 17 by means of side rods 32. Four motors 33, 34, 35 and 36, having pinions 37, 38, 39 and 40, are disposed symmetrically around the jack shaft 30 so that the pinions shall mesh with the gear wheels 31 which are mounted on the jack shaft 30.

Sloping hoods 41 may be mounted directly on each of the running gears 3 and 4 for protecting a blower system or some similar auxiliary apparatus.

The locomotive above described has extremely good running and tracking characteristics by reason of the four-wheel outer truck and the two-wheel truck with which it is provided and, moreover, the locomotive is capable of developing a high tractive effort at high speed by reason of the number of motors that are connected to each pair of driving wheels.

Variations in the structure and arrangement and location of parts may be made without departing from the spirit and scope of my invention, and such modifications are intended to be covered in the appended claims.

I claim as my invention:

1. In a locomotive, the combination with a cab, of two articulated running gears pivotally connected to the cab, each of said running gears comprising two pairs of driving wheels, a four-wheel outer guiding truck, and a two-wheel inner truck.

2. In a locomotive, the combination with a cab, of two articulated running gears pivotally connected to the cab, each of said running gears comprising a four-wheel outer truck, a two-wheel inner truck, and a number of pairs of driving wheels disposed between said outer and said inner truck.

3. In a locomotive, the combination with a cab, of two articulated running gears pivotally connected to the cab, each of said running gears comprising an outer and an inner auxiliary truck, a plurality of pairs of driving wheels disposed between said auxiliary trucks, and independent driving means connected to each pair of driving wheels.

4. In a locomotive, the combination with a cab, of two articulated running gears pivotally connected to the cab, each of said running gears comprising two pairs of driving wheels, a four-wheel outer guiding truck, a two-wheel inner radial truck, a jack shaft connected to each pair of said driving wheels, and a plurality of motors connected to each of said jack shafts.

5. In a locomotive, the combination with a cab, of two articulated running gears pivotally connected to the cab, each of said running gears comprising a four-wheel outer truck, a two-wheel inner truck, two pairs of driving wheels disposed between said trucks, a jack shaft located adjacent to each pair of driving wheels, side rods for joining each jack shaft to the associated pair of driving wheels, and four motors surrounding and connected to each jack shaft.

6. In a locomotive, a running gear having two pairs of driving wheels, a jack shaft associated with each pair of driving wheels, four motors connected to and symmetrically disposed around each jack shaft, and side rods for connecting each jack shaft to the associated pair of driving wheels.

7. In a locomotive, the combination with a single cab, of a plurality of articulated running gear units pivotally connected to the cab, each unit comprising a four-wheel truck, a two-wheel auxiliary truck, a plurality of independent pairs of driving wheels, and independent means connected to each pair of driving wheels for propelling the same.

8. In an electric locomotive, the combination with a single cab, of a plurality of running gear units pivotally connected to the cab, each of said units comprising a four-wheel truck, a two-wheel auxiliary truck, a plurality of independent pairs of driving wheels, a jack shaft associated with each pair of driving wheels, a plurality of motors disposed symmetrically around and connected to each jack shaft, and independent means connecting said jack shafts to the pairs of driving wheels with which they are associated.

9. A running gear for a locomotive comprising a number of pairs of driving wheels, a four-wheel pivotal guiding truck, a two-wheel radial truck, a jack shaft disposed adjacent to each pair of driving wheels and connected thereto, and means comprising four motors for independently operating each jack shaft.

10. A running gear for a locomotive comprising two pairs of driving wheels, a four-wheel and a two-wheel auxiliary truck, a jack shaft mounted adjacent to each pair of driving wheels, side rods for connecting each jack shaft to the associated pair of driving wheels, and a plurality of motors connected to and symmetrically located around each jack shaft.

11. A running gear for a locomotive comprising two pairs of driving wheels, a four-wheel pivotal guiding truck, a two-wheel radial truck, a jack shaft mounted adjacent to each pair of driving wheels, side rods for connecting each jack shaft to the associated pair of driving wheels, and four motors surrounding and connected to each jack shaft.

In testimony whereof, I have hereunto subscribed my name this 25th day of Oct., 1916.

NORMAN W. STORER.